United States Patent
Del Beccaro et al.

(10) Patent No.: US 7,913,273 B2
(45) Date of Patent: Mar. 22, 2011

(54) SYSTEM AND METHOD FOR RECEIVING BROADCAST AUDIO/VIDEO WORKS AND FOR ENABLING A CONSUMER TO PURCHASE THE RECEIVED AUDIO/VIDEO WORKS

(75) Inventors: David J. Del Beccaro, Jenkintown, PA (US); Jeremy Rosenberg, Havre de Grace, MD (US)

(73) Assignee: Music Choice, Horsham, PA (US)

( * ) Notice: Subject to any disclaimer, the term of this patent is extended or adjusted under 35 U.S.C. 154(b) by 1847 days.

(21) Appl. No.: 10/094,504

(22) Filed: Mar. 11, 2002

(65) Prior Publication Data
US 2002/0120936 A1   Aug. 29, 2002

Related U.S. Application Data

(63) Continuation of application No. 09/969,627, filed on Oct. 4, 2001, now abandoned.

(60) Provisional application No. 60/238,913, filed on Oct. 10, 2000.

(51) Int. Cl.
*H04N 7/167* (2006.01)

(52) U.S. Cl. .......... 725/31; 725/100; 725/139; 725/142; 725/151

(58) Field of Classification Search .................. 725/100, 725/139, 142, 151, 31, 28, 46
See application file for complete search history.

(56) References Cited

U.S. PATENT DOCUMENTS

| | | | |
|---|---|---|---|
| 4,127,796 A | 11/1978 | Henderson | |
| RE29,997 E | 5/1979 | Den Toonder | |
| 4,336,478 A | 6/1982 | Quilty et al. | |
| 4,338,623 A | 7/1982 | Asmus et al. | |
| 4,360,805 A | 11/1982 | Andrews et al. | |
| 4,677,430 A | 6/1987 | Falkman et al. | |
| 4,722,005 A | 1/1988 | Ledenbach | |

(Continued)

FOREIGN PATENT DOCUMENTS

EP   1 022 900 A1   7/2000

(Continued)

OTHER PUBLICATIONS

Loeb, S., "Architecting Personalized Delivery of Multimedia Information", Communications of the ACM, Dec. 1992, vol. 35, No. 12, pp. 39-48.

(Continued)

*Primary Examiner* — John W Miller
*Assistant Examiner* — Sumaiya A Chowdhury
(74) *Attorney, Agent, or Firm* — Rothwell, Figg, Ernst & Manbeck, P.C.

(57) ABSTRACT

A system and method for purchasing broadcast audio and/or video (audio/video) works. According to one embodiment, the system includes a data stream processor that receives a broadcast audio/video data stream and produces from the broadcast audio/video data stream a first audio/video output data stream and a second audio/video output data stream, wherein the broadcast audio/video data stream contains information corresponding to an audio/video work and the first audio/video output stream is in a format that can be recognized and processed by conventional audio/video reproducing equipment; a storage device that stores data included in the second audio/video output data stream, wherein the data corresponds to the audio/video work; and a user interface that enables a user of the system to input to the system an indication that the user desires to purchase the audio/video work.

38 Claims, 5 Drawing Sheets

U.S. PATENT DOCUMENTS

| | | |
|---|---|---|
| 4,760,455 A | 7/1988 | Nagashima |
| 4,799,156 A | 1/1989 | Shavit et al. |
| 4,823,386 A * | 4/1989 | Dumbauld et al. ............ 380/211 |
| 5,130,615 A | 7/1992 | George |
| 5,193,006 A | 3/1993 | Yamazaki |
| 5,235,680 A * | 8/1993 | Bijnagte ......................... 707/10 |
| 5,315,448 A * | 5/1994 | Ryan ............................... 360/60 |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. ................... 348/571 |
| 5,418,654 A | 5/1995 | Scheffler |
| 5,420,838 A * | 5/1995 | Maeda et al. ................ 369/30.09 |
| 5,481,296 A | 1/1996 | Cragun et al. |
| 5,534,911 A | 7/1996 | Levitan |
| 5,550,863 A | 8/1996 | Yurt et al. |
| 5,557,541 A | 9/1996 | Schulhof et al. |
| 5,572,442 A | 11/1996 | Schulhof et al. |
| 5,585,866 A | 12/1996 | Miller et al. |
| 5,590,282 A | 12/1996 | Clynes |
| 5,592,511 A | 1/1997 | Schoen et al. |
| 5,616,876 A | 4/1997 | Cluts |
| 5,617,565 A | 4/1997 | Augenbraun et al. |
| 5,629,867 A | 5/1997 | Goldman |
| 5,635,989 A | 6/1997 | Rothmuller |
| 5,636,276 A | 6/1997 | Brugger |
| 5,646,992 A * | 7/1997 | Subler et al. ...................... 705/53 |
| 5,675,734 A | 10/1997 | Hair |
| 5,708,780 A | 1/1998 | Levergood et al. |
| 5,721,815 A | 2/1998 | Ottesen et al. |
| 5,726,909 A | 3/1998 | Krikorian |
| 5,734,719 A | 3/1998 | Tsevdos et al. |
| 5,734,961 A | 3/1998 | Castille |
| 5,751,282 A | 5/1998 | Girard et al. |
| 5,751,806 A * | 5/1998 | Ryan ............................... 380/237 |
| 5,753,844 A | 5/1998 | Matsumoto |
| 5,754,939 A | 5/1998 | Herz et al. |
| 5,761,606 A | 6/1998 | Wolzien |
| 5,761,607 A | 6/1998 | Gudesen |
| 5,761,662 A | 6/1998 | Dasan |
| 5,771,435 A | 6/1998 | Brown |
| 5,781,889 A | 7/1998 | Martin et al. |
| 5,784,095 A | 7/1998 | Robbins et al. |
| 5,784,595 A | 7/1998 | Devins et al. |
| 5,790,935 A | 8/1998 | Payton |
| 5,793,980 A | 8/1998 | Glaser et al. |
| 5,809,144 A | 9/1998 | Sirbu et al. |
| 5,809,246 A | 9/1998 | Goldman |
| 5,819,049 A | 10/1998 | Rietmann |
| 5,819,160 A | 10/1998 | Foladare et al. |
| 5,835,487 A | 11/1998 | Campanella |
| 5,841,979 A | 11/1998 | Schulhof et al. |
| 5,848,398 A | 12/1998 | Martin et al. |
| 5,861,906 A | 1/1999 | Dunn et al. |
| 5,878,141 A | 3/1999 | Daly et al. |
| 5,890,137 A | 3/1999 | Koreeda |
| 5,890,139 A | 3/1999 | Suzuki et al. |
| 5,899,699 A | 5/1999 | Kamiya |
| 5,899,980 A | 5/1999 | Wilf et al. |
| 5,900,830 A | 5/1999 | Scheffler |
| 5,913,204 A | 6/1999 | Kelly |
| 5,918,213 A | 6/1999 | Bernard et al. |
| 5,926,624 A | 7/1999 | Katz et al. |
| 5,930,765 A | 7/1999 | Martin |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. |
| 5,959,945 A | 9/1999 | Kleiman |
| 5,960,411 A | 9/1999 | Hartman et al. |
| 5,961,662 A | 10/1999 | Yamaguchi et al. |
| 5,968,120 A | 10/1999 | Guedalia |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. |
| 5,986,692 A | 11/1999 | Logan et al. |
| 5,991,374 A | 11/1999 | Hazenfield |
| 5,991,737 A | 11/1999 | Chen ................................. 705/26 |
| 6,011,761 A | 1/2000 | Inoue |
| 6,011,854 A | 1/2000 | Van Ryzin |
| 6,020,883 A | 2/2000 | Herz |
| 6,021,432 A | 2/2000 | Sizer, II et al. |
| 6,025,868 A | 2/2000 | Russo ................................ 348/2 |
| 6,029,045 A * | 2/2000 | Picco et al. ...................... 725/34 |
| 6,038,591 A | 3/2000 | Wolfe et al. |
| 6,055,314 A | 4/2000 | Spies et al. |
| 6,055,566 A | 4/2000 | Kikinis |
| 6,085,235 A | 7/2000 | Clarke, Jr. et al. |
| 6,088,455 A | 7/2000 | Logan et al. |
| 6,088,722 A | 7/2000 | Herz et al. |
| 6,105,060 A | 8/2000 | Rothblatt |
| 6,135,646 A | 10/2000 | Kahn et al. |
| 6,141,488 A * | 10/2000 | Knudson et al. ................. 386/83 |
| 6,151,634 A | 11/2000 | Glaser et al. |
| 6,154,206 A * | 11/2000 | Ludtke ........................... 713/168 |
| 6,154,772 A | 11/2000 | Dunn et al. |
| 6,161,142 A | 12/2000 | Wolfe et al. |
| 6,192,340 B1 | 2/2001 | Abecassis |
| 6,223,292 B1 | 4/2001 | Dean et al. |
| 6,226,030 B1 | 5/2001 | Harvey et al. |
| 6,226,618 B1 | 5/2001 | Downs et al. |
| 6,229,895 B1 | 5/2001 | Son et al. |
| 6,232,539 B1 | 5/2001 | Looney et al. |
| 6,233,389 B1 | 5/2001 | Barton et al. |
| 6,233,682 B1 | 5/2001 | Fritsch |
| 6,240,553 B1 | 5/2001 | Son et al. |
| 6,243,725 B1 | 6/2001 | Hempleman et al. |
| 6,246,672 B1 | 6/2001 | Lumelsky |
| 6,248,946 B1 | 6/2001 | Dwek |
| 6,249,810 B1 | 6/2001 | Kiraly |
| 6,253,235 B1 | 6/2001 | Estes |
| 6,253,237 B1 | 6/2001 | Story et al. |
| 6,262,772 B1 | 7/2001 | Shen et al. |
| 6,279,040 B1 | 8/2001 | Ma et al. |
| 6,286,139 B1 | 9/2001 | Decinque |
| 6,305,020 B1 | 10/2001 | Horaty et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,338,044 B1 | 1/2002 | Cook et al. |
| 6,369,851 B1 | 4/2002 | Marflak et al. |
| 6,389,467 B1 | 5/2002 | Eyal |
| 6,393,430 B1 | 5/2002 | Van Ryzin |
| 6,418,421 B1 | 7/2002 | Hurtado et al. |
| 6,434,747 B1 | 8/2002 | Khoo et al. |
| 6,445,306 B1 | 9/2002 | Trovato et al. |
| 6,446,080 B1 | 9/2002 | Van Ryzin |
| 6,446,130 B1 | 9/2002 | Grapes |
| 6,490,728 B1 | 12/2002 | Kitazato et al. |
| 6,496,980 B1 * | 12/2002 | Tillman et al. ................... 725/90 |
| 6,505,240 B1 | 1/2003 | Blumenau |
| 6,507,727 B1 | 1/2003 | Henrick |
| 6,526,411 B1 | 2/2003 | Ward |
| 6,550,011 B1 | 4/2003 | Sims, III |
| 6,573,444 B1 * | 6/2003 | Yamamoto et al. ............. 84/604 |
| 6,587,127 B1 | 7/2003 | Leeke et al. |
| 6,587,837 B1 | 7/2003 | Spagna et al. |
| 6,628,891 B1 * | 9/2003 | Vantalon et al. ................. 386/94 |
| 6,732,366 B1 * | 5/2004 | Russo ................................ 725/5 |
| 6,748,237 B1 | 6/2004 | Bates et al. |
| 6,748,427 B2 | 6/2004 | Drosset et al. |
| 6,766,357 B1 | 7/2004 | Fandozzi |
| 6,782,550 B1 | 8/2004 | Cao |
| 6,789,106 B2 | 9/2004 | Eyer et al. |
| 6,792,280 B1 | 9/2004 | Hori et al. |
| 6,842,604 B1 | 1/2005 | Cook |
| 6,856,550 B2 | 2/2005 | Kato et al. |
| 6,865,550 B1 | 3/2005 | Cok |
| 6,898,800 B2 | 5/2005 | Son et al. |
| 6,925,489 B1 | 8/2005 | Curtin |
| 6,933,433 B1 | 8/2005 | Porteus |
| 6,985,694 B1 | 1/2006 | De Bonet |
| 7,020,888 B2 | 3/2006 | Reynolds |
| 7,024,678 B2 * | 4/2006 | Gordon et al. ................... 725/88 |
| 7,028,082 B1 | 4/2006 | Rosenberg |

| | | | |
|---|---|---|---|
| 7,065,287 B1 | 6/2006 | Heredia et al. | |
| 7,076,561 B1 | 7/2006 | Rosenberg | |
| 7,111,099 B2 | 9/2006 | Alexander | |
| 7,133,924 B1 | 11/2006 | Rosenberg | |
| 7,149,471 B1 | 12/2006 | Arisawa et al. | |
| 7,215,718 B1* | 5/2007 | Calderbank et al. | 375/299 |
| 7,321,923 B1 | 1/2008 | Rosenberg et al. | |
| 7,325,043 B1 | 1/2008 | Rosenberg et al. | |
| 7,343,179 B1 | 3/2008 | Theis | |
| 7,370,016 B1 | 5/2008 | Hunter et al. | |
| 7,711,838 B1 | 5/2010 | Boulter et al. | |
| 7,797,446 B2 | 9/2010 | Heller et al. | |
| 2001/0032312 A1 | 10/2001 | Runje | |
| 2001/0042107 A1 | 11/2001 | Palm | |
| 2001/0049826 A1 | 12/2001 | Wilf | |
| 2002/0021708 A1 | 2/2002 | Ishiai | |
| 2002/0023163 A1 | 2/2002 | Frelechoux et al. | |
| 2002/0023164 A1 | 2/2002 | Lahr | |
| 2002/0023166 A1 | 2/2002 | Bar-Noy et al. | |
| 2002/0032728 A1 | 3/2002 | Sako et al. | |
| 2002/0038359 A1 | 3/2002 | Ihara et al. | |
| 2002/0046084 A1 | 4/2002 | Steele et al. | |
| 2002/0056117 A1 | 5/2002 | Hasegawa et al. | |
| 2002/0056118 A1 | 5/2002 | Hunter et al. | |
| 2002/0059621 A1 | 5/2002 | Thomas et al. | |
| 2002/0062261 A1 | 5/2002 | Mukai | |
| 2002/0083148 A1 | 6/2002 | Shaw et al. | |
| 2002/0138630 A1 | 9/2002 | Solomon | |
| 2002/0147634 A1 | 10/2002 | Jacoby et al. | |
| 2002/0152278 A1 | 10/2002 | Pontenzone | |
| 2002/0194260 A1 | 12/2002 | Headley et al. | |
| 2002/0194619 A1 | 12/2002 | Chang et al. | |
| 2003/0023975 A1 | 1/2003 | Schrader | |
| 2003/0050058 A1 | 3/2003 | Walsh et al. | |
| 2003/0097338 A1* | 5/2003 | Mankovich et al. | 705/64 |
| 2003/0126595 A1 | 7/2003 | Sie et al. | |
| 2003/0135464 A1 | 7/2003 | Mourad | |
| 2003/0182184 A1 | 9/2003 | Strasnick | |
| 2003/0187739 A1 | 10/2003 | Powers | |
| 2006/0173974 A1 | 8/2006 | Tang | |

FOREIGN PATENT DOCUMENTS

| | | |
|---|---|---|
| WO | WO 97/37492 A1 | 10/1997 |
| WO | WO 99/17230 A1 | 4/1999 |
| WO | WO 99/48296 A1 | 9/1999 |
| WO | WO 00/07368 | 2/2000 |
| WO | WO 01/35874 A1 | 5/2001 |
| WO | WO 01/36064 A1 | 5/2001 |

OTHER PUBLICATIONS

Sweeney, John, "An introduction to interactive television", International Broadcasting Convention, 1994, 10 pages.
Bemotas, Adolphe V., "Computers and TV: Marriage of the Future", St. Louis Post Dispatch, Oct. 11, 1995, 1 page.
Office Action issued on Oct. 1, 2010 in U.S. Appl. No. 11/928,959, 13 pages.
6 Pages from the web site for www.request.com.
Clark D., "ClickRadio to Start Digital Music Services," WSJ Interactive Edition, 2000.
"ClickRadio granted first interactive radio license by universal music group; . . . ," www.clickradio.com, printed Apr. 20, 2000.
Gordon, C., "ClickR adio sidesteps competition with music licensing deals," Atnewyork.com., May 12, 2000.
"Phillips showcases clickradio on digital set-top at western show 2000; . . . ," Business Wire, Inc., Nov. 29, 2000.
Web site for www.sonicnet.com., printed Jun. 22, 2004, 6 pages.
ntl: Digital Radio. http://www.ntl.com/locales/gb/en/guides/dummies/produce.asp, 2 pages.
Bower, "Digital Radio—A Revolution for In-Car Entertainment," Proc. NavPos Automative '98 Conf. vol. 2, Session 5-8, 10 pages, Jun. 10, 1998.
Deutsche Telekom AG: Digital Radio, http://www.telekom.de/dtag/ipll/cda/level3_a/0,3680,10077,00.html, 1 page.
The Eureka 147 Consortium, "Digital Audio Broadcasting" http://www.eurekadab.org/eureka_147_consortium.htm, 3 pages.
Radio Authority, Digital Radio Fact Sheet No. 4, 1999. http://www.radioauthority.org.uk/Information/Fact_Sheets/fs4.htm, 5 pages.
"The ICTV Digital Broadband System," ICTV, Inc. White Paper, 2000, 11 pages.
http://launch.yahoo.com, "Music on Yahoo", 2 pages.
"Sonicbox brings Net radio into your living room," (Partyka, Jeff. Oct. 12, 1999. CNN.com), 3 pages.
"Internet Radio Listeners Unchained From Their PCs," (Olenick, Doug. Oct. 25, 1999. Twice Computer Technology), 1 page.
"Sonicbox and Microsoft Bring Windows Media Internet Radio to the Home Stereo," (Dec. 7, 1999 Microsoft Press Release), 3 pages.
King, "Tune on, Tune in, Drop Cash" Dec. 8, 2000, Wired News, 4 pages.
"Global Media Announces Launch of Independent Internet Radio station,"; News Release, Feb. 1, 1999, 2 pages.
"Platinum Entertainment and Liquid Audio Join Forces to Offer Extensive Music Catalog via Digital Downloads", Press Relaese, Jul. 15, 1998, 2 pages.
LaFrance, "Thinking Globally with a web-based radio station vying for listeners around the world, homegrown Internet company fastband aims to shake up the music world", Times Picayune, Nov. 4, 1999, 2 pages.
"Tune into Yahoo! Radio," Yahoo Media Relations Press Release, Yahoo! teams up with Broadcast.com and Spinner.com to Provide 10 stations of Audio Programming, May 11, 1999, 2 pages.
Yahoo Offers one-stop shop for e-music, Milwaulkee Journal Sentinel (Wisconsin), Aug. 25, 1999, 1 page.
uniView Technologies Now in Yahoo!'s Multicast Affiliate Program, Press Release Newswire Association, Inc., Oct. 19, 1999, 2 pages.
"WebRadio.com Signs on as Liquid Music Network Affiliate Offering Liquid Audio Digital Downloads," Business Wire, Inc., Sep. 1, 1999, 2 pages.
"Blue Note Radio," Now Playing on a Computer Screen Near You. EMI's Blue Note Records Expands New Media Initiative with RadioWave.com, Press Release Newswire Association, Inc., Apr. 4, 2000, 2 pages.
"Set-top box for television that reads your mind," Financial Times Limited, Dec. 30, 1998, 1 page.
Rajapakshe, H. et al., "Video on Demand," Jun. 1995, pp. 1-15.
Welz, G., "Integrated Streaming Technologies," Oct. 30, 1996, pp. 1-3.

* cited by examiner

SYSTEM AND METHOD FOR RECEIVING BROADCAST AUDIO/VIDEO WORKS AND FOR ENABLING A CONSUMER TO PURCHASE THE RECEIVED AUDIO/VIDEO WORKS

This application claims the benefit of U.S. Provisional Patent Application No. 60/238,913, filed Oct. 10, 2000, which is incorporated herein in its entirety by this reference.

BACKGROUND OF THE INVENTION

1. Field of the Invention

The present invention is generally related to electronic commerce, and, more specifically, to a system for enabling the purchase of a broadcast audio and/or video work.

2. Discussion of the Background

A song, or another type of work (e.g., a video), that is broadcast to the public, through radio stations, satellite systems, cable television systems, the Internet, and other like systems, often stimulates a desire in a consumer who is receiving the broadcast to purchase the song (or other work) being broadcast. In the case of a song, to satisfy this impulsive desire to purchase, the consumer must (1) know the artists or title of the song and (2) travel to a retail outlet, such as a record store, video store, or department store, or log onto a web site that sells music, to purchase a compact disc (CD) containing the song.

There are several disadvantages with this approach to buying media For instance, for music, at the time the desire to purchase the music is stimulated, the consumer may not have the time nor the opportunity to travel to a retail outlet or log onto a web site to purchase the music. Additionally, there is no guarantee that the consumer will know the artist and/or title of the music he or she desires to buy. Furthermore, it is often not possible to purchase a single song. For example, in most cases a desired song is only distributed on a CD (or other storage media) on which a number of other songs from the artist are stored.

What is desired, therefore, is a system to enable a consumer to purchase a song (or other work) at the time the desire to purchase the work is stimulated or at a later time. Additionally, it may be desired to provide the consumer with instant access to the purchased work.

SUMMARY OF THE INVENTION

Embodiments of the present invention provide a system and methods for purchasing broadcast audio and/or video (hereafter "audio/video") works, or other works, including textual works (such as digital books etc), still images, software, etc. According to one embodiment, the system includes a data stream processor, a persistent data storage device, a user interface, and a processing unit.

The data stream processor functions to receive and process a broadcast audio/video data stream (i.e., signal) that, at a given point in time, may include information corresponding to an audio/visual work, such as a musical selection (e.g., a song) or video (e.g., music video). The data stream processor produces from the broadcast stream a first audio/video output data stream and a second audio/video output data stream. Each of the output streams contains the same information (i.e., audio/video work), but the information in each output stream may be formatted or encoded differently. For example, the information in the first audio/video output stream may be in a format that can be recognized and processed by conventional audio/visual reproducing equipment, such as a television (TV) or stereo system. The information in the second output stream may be in the same format as the information in the broadcast stream or first output stream or it can be encoded according to a different scheme altogether. As a specific example, for audio information, the information in the second output stream may be encoded according to the MP3, Real Audio, Windows Media™, or other like format.

Advantageously, the data in the second output stream is either temporarily buffered in a storage device (e.g., random access memory (RAM) or other similar volatile memory or flash memory useful for the temporary buffering of data) or stored on a persistent storage device, such as a hard disk or other like functioning storage means useful for storing data for long periods of time. In one embodiment, a digital rights management technology (for example, an encryption scheme) is used to protect the audio/video work that is temporarily buffered or stored in the storage device from unauthorized use and/or copying. That is, the audio/video work is copy and/or use protected. The audio/video work may be copy and/or use protected by the broadcaster that broadcasts the work or by the system.

The system enables a consumer to purchase or obtain the audio/video work contained in the signal being processed by the data stream processor. According to one embodiment, to make the purchase, the consumer simply sends a "buy" signal to the processing unit within the system. The consumer may accomplish this by selecting a particular push button or menu item provided by the system's user interface.

In one embodiment, upon receiving the buy signal, the processing unit communicates with an authorization system that verifies that the consumer is authorized to "purchase" the work. After it is determined that the consumer is authorized, the processing unit copies the work from the storage device into a file created on the persistent storage device within the system. If necessary, the processing unit will also disable some or all of the protection that limits the copying and/or use of the work so that the authorized consumer may, at the least, play the audio/video work one or more times. For example, if the work was protected by an encryption scheme the processing unit may decrypt the work. However, the processing unit may not disable all of the copy and/or use protection because the authorized consumer may only be authorized to copy and/or use the work in a limited manner.

Prior to or shortly after copying the work from the storage device onto the persistent storage device, the processing unit has the option of encoding the work according to a different encoding scheme. For example, if the data in the storage device is music data and is encoded according to the DOLBY AC-III format, then, prior to or shortly after storing the music data in the persistent storage device, the processing unit may convert the music data to the MP3 format, Windows Media format, or some other format that preferably provides data compression.

In another embodiment, after receiving the buy signal, the processing unit copies the purchased work from the storage device onto the persistent storage device within the system. As described above, prior to copying the work from the storage device onto the persistent storage device, the processing unit has the option of encoding the work according to a different encoding scheme. However, an authorization system must first authorize the "purchase" before the consumer can access and use the work stored on the persistent storage device. Thus, in one embodiment, a digital rights management technology is used to protect the work stored on the persistent storage device from unauthorized copying and/or use so that the consumer will not be able to copy and/or use the work without first being authorized by the authorization system. The consumer may receive authorization from the authorization system whenever it is convenient for the consumer. In one embodiment, to become an authorized user of the work, the consumer can communicate with the authorization system using a standard telephone or using a personal computer and the Internet. In an embodiment where the work is protected using encryption, the authorization system provides a key to decrypt the work after the consumer is authorized.

Once the encoded information corresponding to the purchased work is stored on the persistent storage device and the authorization system has authorized the purchase (e.g., provided the consumer with a decryption key), the consumer can reproduce the audio/visual work one or more times at the consumer's will. For example, if the work is a sound recording, the consumer can use a sound recording system to play the sound recording. In this manner, the system provides a means for a consumer to "purchase" a broadcast audio/visual work at the time the work is being broadcast. Thus, if a consumer sees or hears a work that he or she would like to acquire, the consumer can immediately purchase the work without having to travel to a store or log onto the web and without even knowing the name of the work or the artist who created the work.

In yet another embodiment, the processing unit automatically stores on the persistent storage device the audio/video work being received and processed by the data stream processor. That is, all of the received audio/video works are stored in the persistent storage device, regardless of whether a user has sent a "buy" signal to the processor. Alternatively, the system may maintain a profile that is configurable by the user of the system. In this alternate embodiment, the processing unit stores in the persistent storage device only those broadcast works received and processed by the data stream processor that match the profile, regardless of whether a user has sent the "buy" signal. In either case, because the user has not been authorized prior to the works being stored in the persistent storage device, the processing unit preferably copy and/or use protects each work using a digital rights management technology, such as, for example, encryption.

These two embodiments allow the user to purchase a work days or weeks after it was received and processed by the data stream processor. But, to conserve storage space, at some point in time the "un-purchased" works are deleted from the persistent storage device. In this embodiment, upon receiving an indication that the user desires to purchase a work or to view a list of the un-purchased works, the processing unit presents to the user a list of the un-purchased works that are stored in the persistent storage device. If the user sees a work that he or she would like to buy, the user selects the work and then signals the processing unit that he or she wants to buy the selected work. The processing unit then communicates with the authorization system to verify that the user is able to purchase the work. If the user is authorized, the user will be given full or limited access and use of the work. That is, some or all of the copy and/or use protection is disabled from the work so that the user can listen to or watch the work at least one or more times as desired.

In yet another embodiment, the data stream processor is configured to receive and process two broadcast audio/video streams simultaneously. Both of the broadcasted streams contain information corresponding to the same audio/visual work. However, the information in each stream is encoded differently, and furthermore, the information in one of the streams may be copy and/or use protected. For example, in one embodiment where the broadcast streams are audio streams, the information in one stream may be encoded according to the Dolby Digital AC-III format, whereas the information in the other stream may be encoded according to a scheme that provides different compression, such as the MP3, Windows Media, or Real Audio format, and may also be encrypted. In this embodiment, the information encoded according to the Dolby AC-III format is processed and output to conventional audio/visual reproducing equipment, such as a television (TV) or stereo system, whereas the copy and/or use protected information encoded according to the MP3, Windows Media, or Real Audio format is temporarily stored in memory or stored in the persistent storage device.

As described above, if the consumer desires to buy an audio/visual work being received by the system or one that has automatically been stored in the persistent storage device, the consumer simply causes a "buy" signal to be sent to the processing unit within the system.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
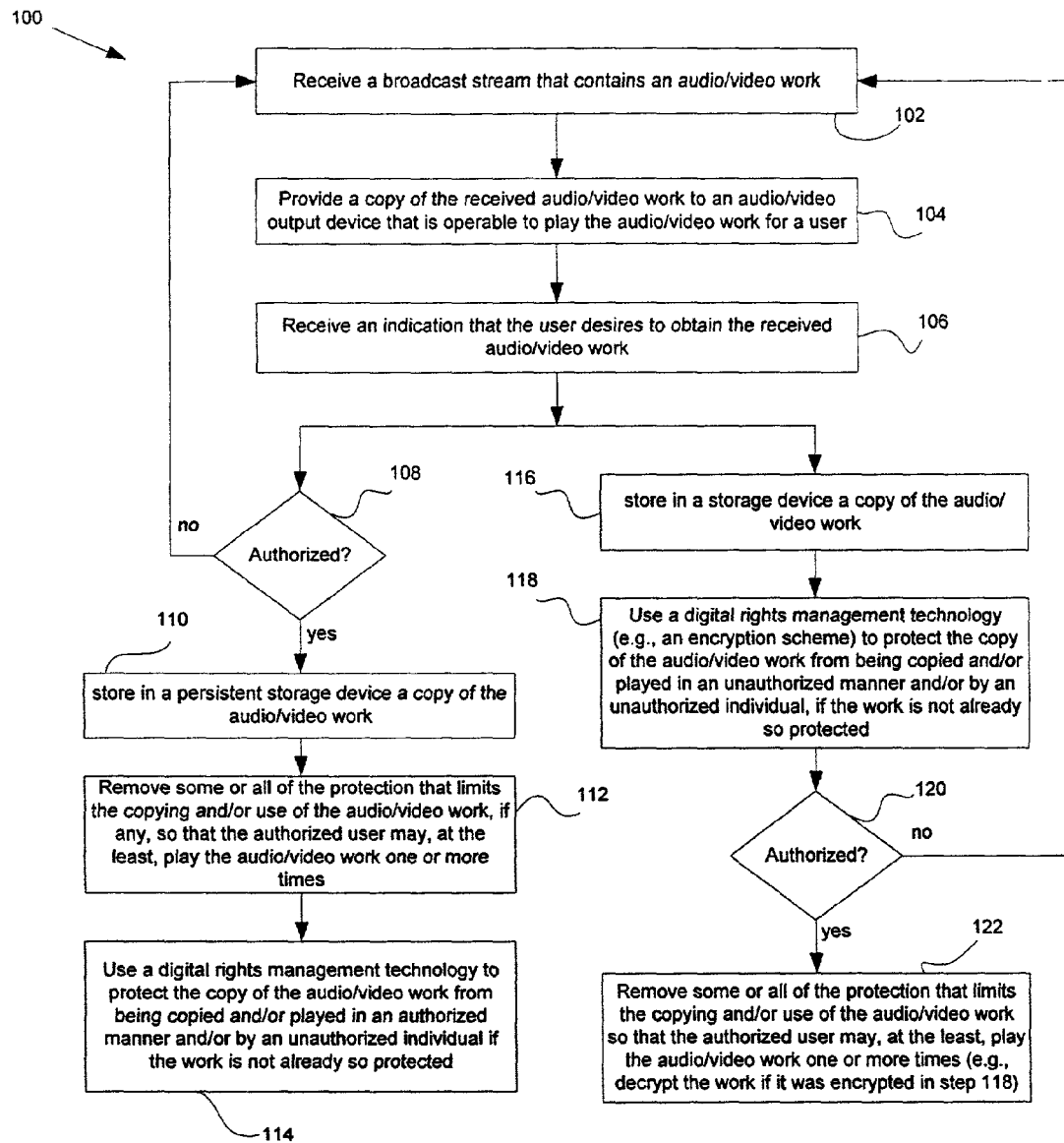
FIGS. 1-3 are flowcharts illustrating various processes according to the present invention.

FIG. 1 is a flowchart illustrating a process 100, according to one embodiment of the invention, for enabling a consumer to purchase a broadcast audio/video work. Process 100 begins in step 102. In step 102, a broadcast stream that contains an audio/video work is received. The audio/video work may be encoded according to one or more encoding schemes. For example, the audio portion of the audio/video work may be encoded according to the DOLBY AC-III encoding scheme.

Next (step 104), the received audio/video work is provided to an audio/video output device that is operable to play the audio/video work for a consumer, thereby enabling the consumer to listen to and/or view the received audio/video work. Next (step 106), an indication is received from the consumer that indicates that the consumer desires to obtain or purchase a copy of the audio/video work. After step 106, in one embodiment, control flows to step 108, and in another embodiment, control flows to step 116.

In step 108, an authorization system is used to determine whether the consumer is authorized to purchase the work. If the proper authorization is given to the consumer, then control passes to step, 110, otherwise control passes back to step 102. In step 110, a copy of the audio/video work is stored in a persistent storage device. In one embodiment, the copy of the audio/video work stored in the persistent storage device is encoded according to one or more encoding schemes that are different from that which was used to encode the work for broadcast. That is, as broadcast, the work may have been encoded according to one scheme (e.g., DOLBY AC-III), but as stored on the persistent storage device the work is encoded according to a different scheme (e.g., Windows Media). After step 110, control passes to step 112.

In step 112, some or all of the protection that limits the copying and/or use of the work, if any, is disabled so that the authorized consumer may, at the least, play the audio/video work one or more times. For example, as broadcast, the work may be protected from unauthorized copying and/or use using a digital rights management technology. If the work is not already protected from unauthorized copying/use, then, in step 114, which is optional, a digital rights management technology is used to protect the work stored in the persistent storage device from being copied and/or used in an unauthorized manner or by an unauthorized individual.

In step 116, the audio/video work is stored in a storage device. In one embodiment, the copy of the audio/video work stored in the storage device is encoded according to one or more encoding schemes that are different from that which was used to encode the work for broadcast. Next (step 118), if the work is not already protected from unauthorized copying/use, then, a digital rights management technology is used to protect the work stored in the storage device from being copied and/or used in an unauthorized manner or by an unauthorized individual.

Next, in step 120, an authorization system is used to determine whether the consumer is authorized to purchase the work. This step may occur hours, day, or weeks after step 106 is performed. If the proper authorization is given to the consumer, then control passes to step, 122, otherwise control passes back to step 102.

In step 122, some or all of the protection that limits the copying and/or use of the work, if any, is disabled so that the authorized consumer may, at the least, play the audio/video work one or more times. For example, if the work was encrypted in step 118, then in step 122 the work may be decrypted.

It should be noted that if the storage device used to store the work in step 116 is not a persistent storage device, then the work is moved from the storage device to a persistent storage device preferably at some point after the consumer is authorized.

Figure 2:
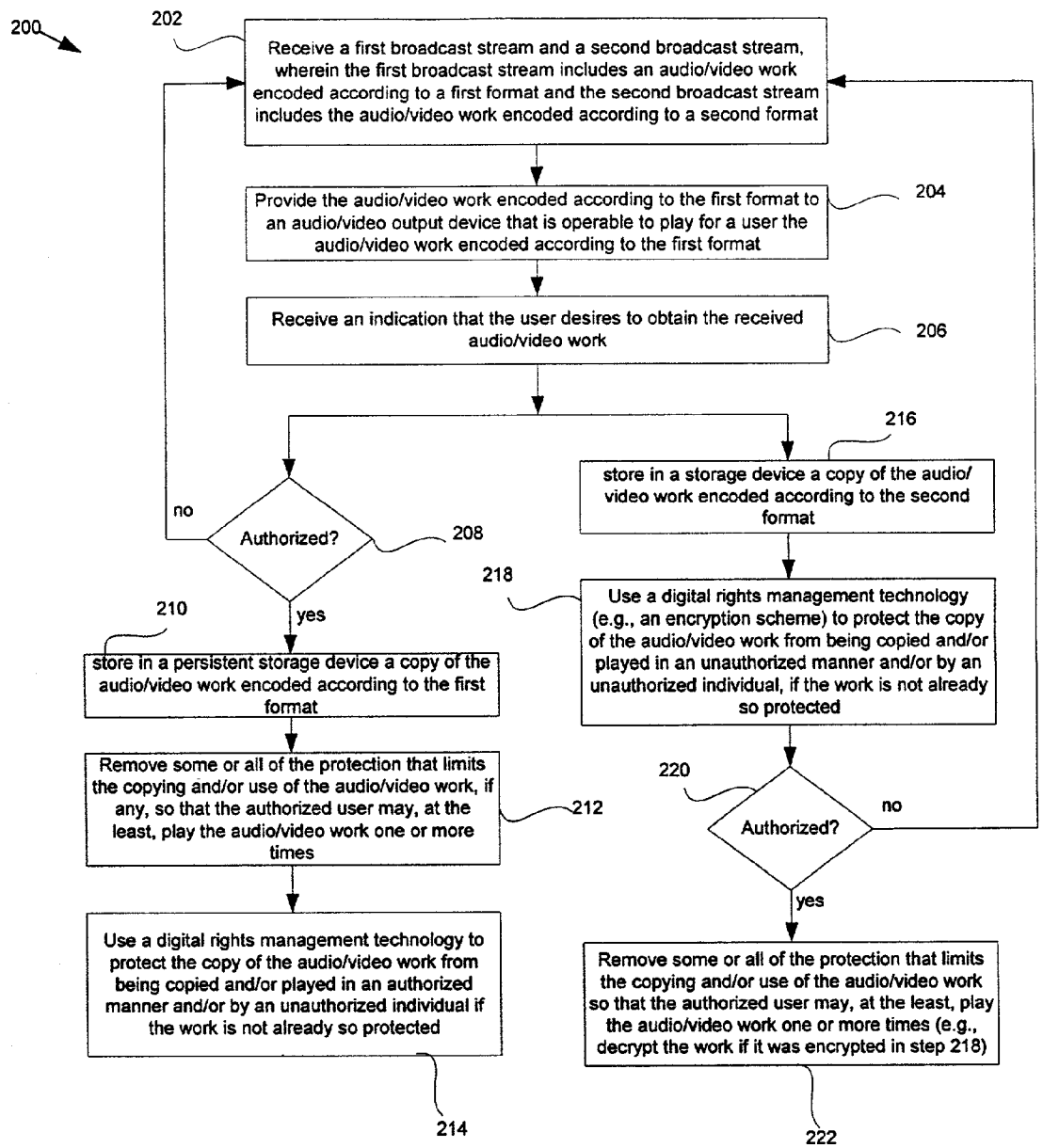

FIG. 2 is a flowchart illustrating a process 200, according to another embodiment of the invention. Process 200 begins in step 202. In step 202, two broadcast streams are received at or about the same time. The first stream includes an audio/video work that is encoded according to an encoding format and the second stream includes the same audio/video work, but the audio/video work from the second stream is encoded according to an encoding format different from the one that is used to encode the work in the first stream. For example, the audio/video work included in the first stream may be DOLBY AC-III encoded, whereas the audio/video work included in the second stream may be Windows Media encoded. After step 202, control passes to step 204.

In step 204, the audio/video work from the first stream is provided to an audio/video output device that is operable to play the audio/video work for a consumer, thereby enabling the consumer to listen to and/or view the received audio/video work. Next (step 206), an indication is received from the consumer that indicates that the consumer desires to obtain or purchase a copy of the audio/video work. After step 206, in one embodiment, control flows to step 208, and in another embodiment, control flows to step 216.

In step 208, an authorization system is used to determine whether the consumer is authorized to purchase the work. If the proper authorization is given to the consumer, then control passes to step, 210, otherwise control passes back to step 202. In step 210, the audio video work from the second stream is stored in a persistent storage device. After step 210, control passes to step 212.

In step 212, some or all of the protection that limits the copying and/or use of the work, if any, is disabled. If the work is not already protected from unauthorized copying/use, then, in step 214, which is optional, a digital rights management technology is used to protect the work stored in the persistent storage device from being copied and/or used in an unauthorized manner or by an unauthorized individual.

In step 216, the audio/video work from the second stream is stored in a storage device. Next (step 218), if the work is not already protected from unauthorized copying/use, then, a digital rights management technology is used to protect the work stored in the storage device from being copied and/or used in an unauthorized manner or by an unauthorized individual. Next (step 220), an authorization system is used to determine whether the consumer is authorized to purchase the work. If the proper authorization is given to the consumer, then control passes to step, 222, otherwise control passes back to step 202. In step 222, some or all of the protection that limits the copying and/or use of the work, if any, is disabled. And, if the storage device used to store the work in step 216 is not a persistent storage device, then the work is moved from the storage device to a persistent storage device preferably at some point after the consumer is authorized.

Figure 3:
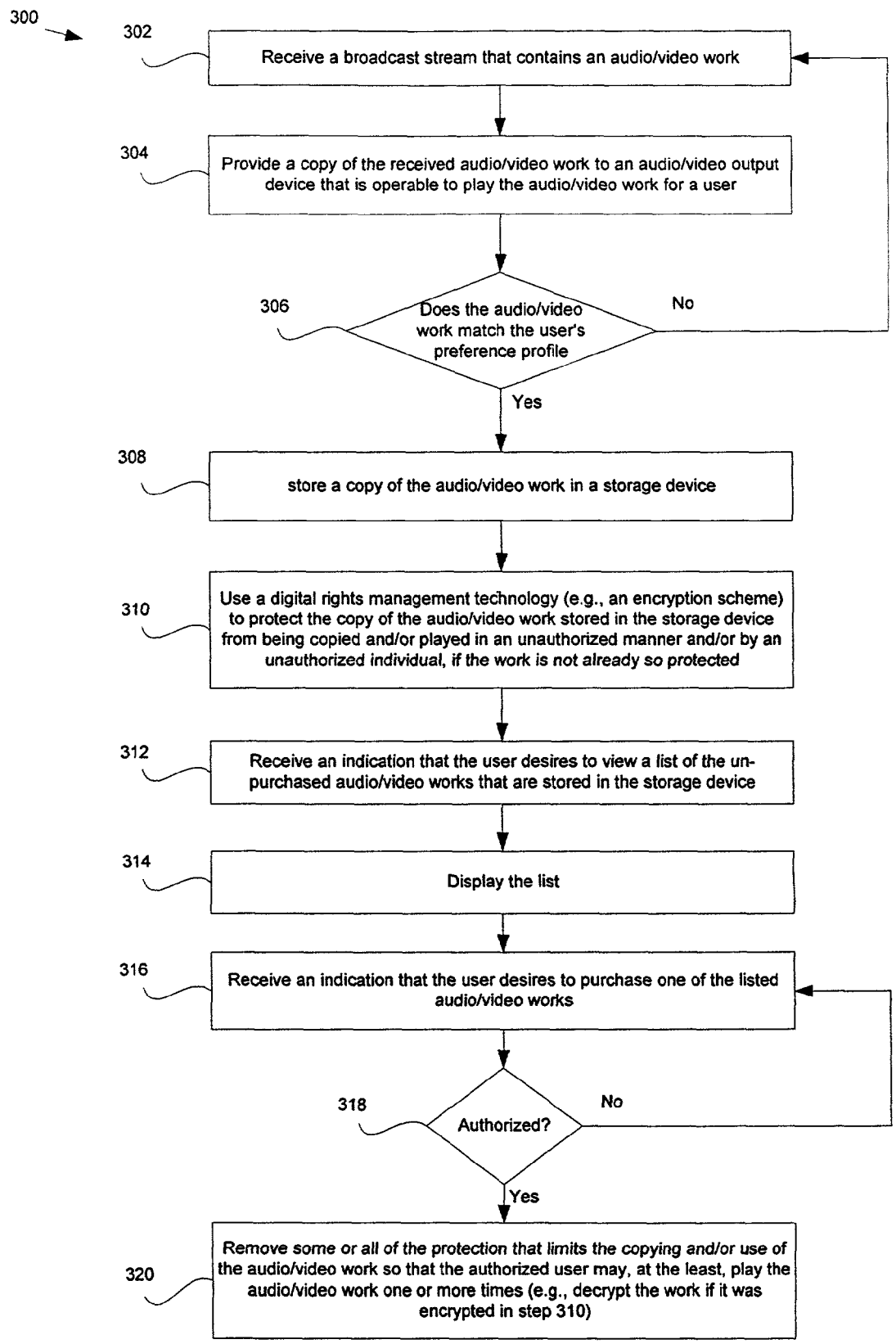

FIG. 3 is a flowchart illustrating a process 300, according to another embodiment of the invention. Process 300 begins in step 302, where a broadcast stream that contains an audio/video work is received. The audio/video work may be encoded according to one or more encoding schemes. Next (step 304), the received audio/video work is provided to an audio/video output device that is operable to play the audio/video work for a consumer, thereby enabling the consumer to listen to and/or view the received audio/video work.

Next (step 306), a determination is made as to whether the audio/video work matches the consumer's profile. If it does, control passes to step 308, otherwise control passes back to step 302. In one embodiment, step 306 is not performed at all and control passes from step 304 to step 308. In step 308, a copy of the received audio/video work is stored in a storage device. In one embodiment, the copy of the audio/video work stored in the storage device is encoded according to an encoding scheme that is different from that which was used to encode the work for broadcast.

Next (step 310), if the work stored in the storage device is not already protected from unauthorized copying/use, then, a digital rights management technology is used to protect the work stored in the storage device from being copied and/or used in an unauthorized manner or by an unauthorized individual. Next (step 312), an indication is received from the consumer that indicates that the consumer desires to view a list of the un-purchased audio/video works that are stored in the storage device. Next (step 314), a list of the un-purchased audio/video works is displayed for the consumer. Next (step 316), an indication is received from the consumer that indicates that the consumer desires to obtain or purchase a copy of one of the listed audio/video works. Next (step 318), an authorization system is used to determine whether the consumer is authorized to purchase the work. If the proper authorization is given to the consumer, then control passes to step, 320, otherwise control passes back to step 316.

In step 320, some or all of the protection that limits the copying and/or use of the work, if any, is disabled so that the authorized consumer may, at the least, play the audio/video work one or more times. For example, if the work was encrypted in step 310, then in step 320 the work may be decrypted.

Figure 4:
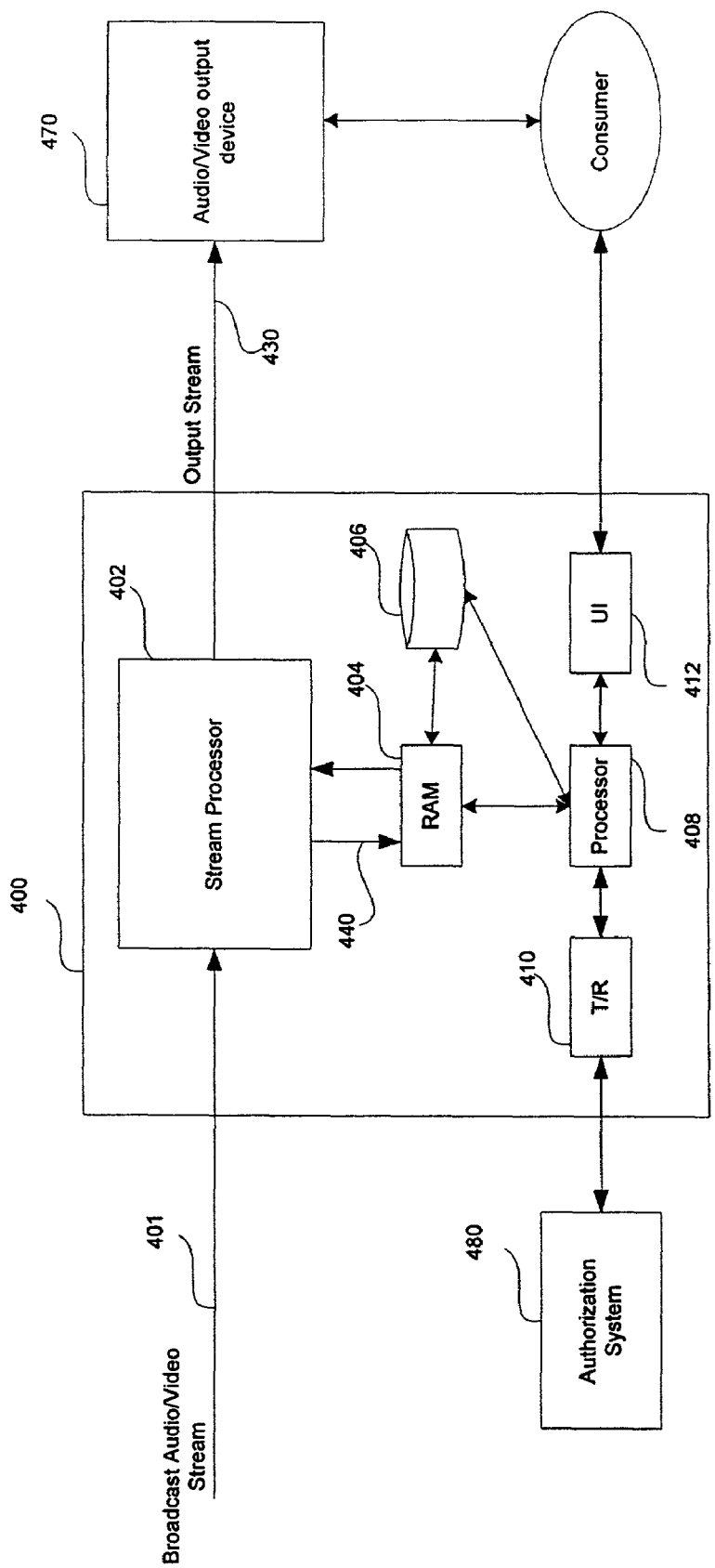
FIG. 4 is a block diagram of a system for receiving broadcasted audio/video streams and for enabling a consumer to purchase the audio/video content being streamed according to one embodiment of the present invention.

FIG. 4 is a block diagram of a system 400, according to one embodiment of the present invention, that can be used to implement the above methods, however, the above methods are not limited to this system or any particular system. System 400 receives and processes a broadcast audio/video data stream, which at a given point in time may include information corresponding to an audio/visual work (e.g., a song or video) and enables a consumer to purchase the audio/visual work. In one embodiment, system 400 includes a data stream processor 402, storage device 404, a persistent storage device 406, a processing unit 408, a transceiver 410, and a user interface 412.

Data stream processor 402 functions to receive a broadcast audio/video data stream 401. There are numerous ways to receive a broadcast audio/video stream 401, such as through analog and digital cable television systems, direct broadcast satellite systems, traditional analog TV and radio broadcasting systems, the Internet, etc. The present invention is not limited to any one such broadcast means or to any particular data stream format.

In one embodiment, data stream processor 402 includes a channel selector or tuner (hereafter "tuner") (not shown) for selecting a particular frequency, channel, station, or Internet address (hereafter "channel") over which audio/video stream 401 is broadcast. Once the channel selector selects the channel over which audio/video stream 401 is broadcast, audio/video stream 401 can be processed as described below.

Data stream processor 402 processes audio/video stream 401 to produce output audio/visual streams 430 and 440. The format of the information in output stream 430 is such that it can be recognized and processed by conventional audio/visual reproducing equipment, such as a TV or stereo system.

The format of the information in output stream 440 can be the same as the broadcast format or the format of output stream 430 or it can be a different format altogether. For example, for audio information, the information in the second output stream can be encoded by processor 402 according to the MP3, Windows Media, Real Audio, or other like format. In one embodiment, the information in input stream 401 is in the Dolby AC-III format and the information in output stream 440 is in the Windows Media format. Thus, in this embodiment, data stream processor 402 includes the necessary software and/or hardware to convert a Dolby AC-III stream to a Windows Media stream.

The information in output stream 440 is stored into storage device 404. Storage device 404 is preferably some form of random access memory (RAM) or other storage means useful for temporarily buffering data. In one embodiment, a digital rights management technology is used to copy and/or use protect the information stored in storage device 404. For example, the information stored in storage device 404 may be encrypted. This feature aims to prevent the unauthorized copying and/or use of the information.

Data stream processor 402 is configured to analyze input stream 401 to determine the beginning and ending of the selections of audio/video works that make up input stream 401. For example, in the case where input stream 401 is broadcast from a radio station or the like and, thus, consists primarily of a selections of songs, data stream processor 402 identifies the beginning and ending of each song in the input stream 401. It is well within the ability of one having ordinary skill in the pertinent art to program data stream processor 402 to perform this identification function. In this way, data stream processor 402 is able to determine the beginning and/or ending of the audio/visual works stored in storage device 404. Because the size of storage device 404 is limited, preferably only the current audio/visual work that is being received and the immediately previous audio/visual work are stored in storage device 404. It should be noted that in some embodiments (e.g., those embodiments where the input stream is a digital signal), input stream 401 may contain metadata to identify the beginning and ending of each song as well as the artist and title of each song.

Continuing with the example above where input stream 401 is an audio stream broadcasted from a radio station or the like, system 400 enables the consumer to purchase the current song being received by data stream processor 402. Thus, system 400 enables impulse buying of songs. Further, the consumer can purchase a song without having to know the name of the artist or the title of the song.

To purchase the song or other work being processed by data stream processor 402, the consumer simply sends a "buy" signal to processing unit 408 through user interface 412. User interface 412 may include a "Purchase Song" push-button or menu item for this purpose. Alternatively, user interface 412 may include an infra-red detector for receiving signals sent from a remote control device that include a "Purchase Song" push button or other like means for enabling the consumer to indicate that he or she desires to purchase a song.

In one embodiment, upon receiving the buy signal, processing unit 408 communicates with an authorization system 480 to verify that the consumer may have access to the song. To accomplish this, processing unit 408 sends a purchase request message to authorization system 480 through transceiver 410. Preferably, the purchase request message includes an identifier that is associated with an account of the consumer's. After receiving the message, authorization system 480 uses the identifier to access the consumer's account to determine whether the consumer is able to make the purchase or is otherwise permitted to have limited or full access to the song. For example, authorization system 480 may determine whether the consumer has sufficient funds in his or her account, has sufficient credit worthiness, or is permitted to obtain the song without making a payment.

If authorization system 480 determines that the consumer is able to make the purchase, authorization system 480 transmits a "purchase request accepted" message to processing unit 408 and then debits the consumer's account or charges his credit card, if required. If authorization system 480 determines that the consumer is not able to make the purchase, authorization system 480 transmits a "purchase request declined" message to processing unit 408. Processing unit 408 receives messages from authorization system 480 through transceiver 410.

If processing unit 408 receives the purchase request declined message, processing unit 408 displays to the consumer though user interface 412 a message indicating that the purchase request has been declined. Otherwise, if processing unit 408 receives the purchase request accepted message, processing unit 408 copies the encoded information corresponding to the purchased work from storage device 404 to persistent storage device 406. If necessary, processing unit 408 may also disable some or all of the protection that limits the copying and/or use of the work so that the authorized consumer may, at the least, play the work one or more times.

It should be noted that prior to or shortly after copying the work from storage device 404 into a file on persistent storage device 406, the processing unit 408 has the option of encoding the work according to a different encoding scheme. For example, if the music information in storage device 404 is encoded according to the DOLBY AC-III format, the processing unit may convert the music information to the Windows Media format, or some other format that provides data compression, prior to or shortly after storing the music information in persistent storage device 406.

In another embodiment, after receiving the buy signal, processing unit 408 uses a digital rights management technology to copy and/or use protect the work stored in storage device 404 and stores the protected work in persistent storage device 406. However, before the consumer can use the protected work stored on the persistent storage device 406, authorization system 480 must first authorize the "purchase." That is, for example, the consumer will not be able to access the work without first getting a key from the authorization system 480 to decrypt the work if the work has been protected through encryption. The consumer can attempt to get the key from the authorization system 480 whenever it is convenient for the consumer. The authorization system 480 may or may not authorize the purchase as described above. In one embodiment, the consumer can communicate with the authorization system 480 to receive the key using a standard telephone or using a personal computer and the Internet.

Once the work is in persistent storage device 406 and the authorization system 480 has authorized the consumer, the consumer call use an audio/video playback system to play the work on a limited or unlimited basis, and thereby view and/or listen to the work.

In one embodiment, to play a purchased audio/visual work stored in persistent storage device 406, the consumer first selects a particular work from the persistent storage device using user interface 412 and then provides a "play" signal to processing unit 408. Upon receiving the play signal, processing unit 408 causes the encoded information corresponding to the work to be read out from storage unit 406 and causes data stream processor 402 to process it to produce an output stream 430.

Therefore, the above described system 400 enables a consumer to purchase a desired selection of audio/video content at the time the desire to purchase the content is stimulated. System 400 also provides the consumer with instant access to the purchased content.

In an alternative method for allowing the consumer to purchase broadcast audio/video works that have been received and processed by stream processor 402, processing unit 408 automatically stores in persistent storage device 406 all of the works in output data stream 440. That is, all of the received works are stored in persistent storage device 406, regardless of whether the consumer has sent a "buy" signal to the processor. Alternatively, the system may maintain a profile that is configurable by the consumer. In this alternate embodiment, processing unit 408 only stores in persistent storage device 406 each broadcast work received and processed by the data stream processor 402 that matches the profile. In either case, because the user has not been authorized prior to the works being stored in persistent storage device 406, processing unit 408 preferably copy and/or use protects each work prior to or shortly after storing the work. These two embodiments allow the user to purchase a work days or weeks after it was received and processed by the data stream processor 402.

Upon receiving an indication that the user desires to purchase a work, processing unit 408 presents to the user a list of the un-purchased works that are stored in persistent storage device 406. If the user sees a work that he or she would like to buy, the user selects the work and then signals processing unit 408 that he or she wants to buy the selected work. Processing unit 408 then communicates with authorization system 480 to verify that the user is able to purchase the work. If the user is verified, the user will be given full or limited access to the work so that the user can listen to or watch the work. That is, some or all of the copy and/or use protection that protects the work from unauthorized copying and/or use will be disabled.

Figure 5:
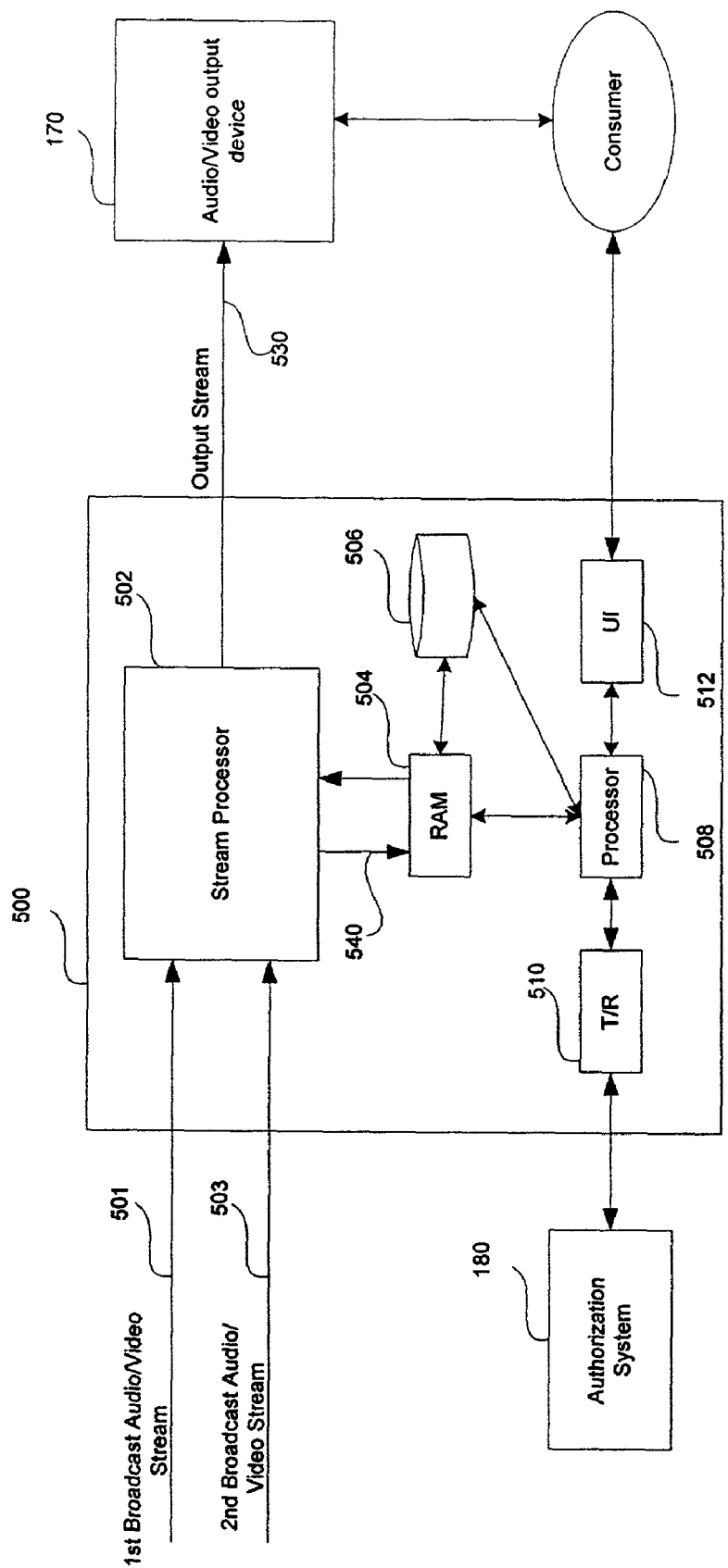
FIG. 5 is a block diagram of a system for receiving broadcasted audio/video streams and for enabling a consumer to purchase the audio/video content being streamed according to another embodiment of the present invention.

FIG. 5 illustrates another embodiment of a system 500 according to the present invention. Like system 400, system 500 includes a data stream processor 502, memory 504, a persistent storage device 506, a processing unit 508, a transceiver 510, and a user interface 512.

A major difference between system 500 and system 400 is that data stream processor 502 is configured to simultaneously process two broadcasted audio/video streams: input stream 501 and input stream 503. Input stream 501 and input stream 503 contain information corresponding to the same audio/visual work. However, in one embodiment, the information in stream 501 is formatted (i.e., encoded) differently than the information in stream 503, and the information in stream 503 may be copy and/or use protected. For example, if the work being broadcast is an audio work (e.g., a song), then the information in stream 501 could be encoded according to the Dolby-ACIII format, whereas the same information in stream 503 could be encoded according to the Windows Media format, MP3 format, Real Audio format, or other like audio format, and may be encrypted.

In one embodiment, input stream 501 and input stream 503 are broadcast on separate channels. In this embodiment, data stream processor 502 includes two channel selectors (not shown). The first channel selector selects the particular channel over which input stream 501 is broadcast, and the second channel selector selects the particular channel over which input stream 503 is broadcast. Once the channel selectors select the channels over which streams 501 and 503 are broadcast, streams 501 and 503 can be processed as described further below.

In another embodiment, input stream 501 and input stream 503 are broadcast over the same channel. For example, input stream 501 could be interleaved with input stream 503 in the same broadcast signal. Thus, in this embodiment, data stream processor 502 does not need two channel selectors. However, data stream processor 502 is configured to extract input stream 501 and input stream 503 from the broadcast signal so that each stream can be processed separately, as described below.

Data stream processor 502 processes input stream 501 to produce output stream 530. The format of the information in output stream 530 is such it that can be recognized and processed by conventional audio/visual reproducing equipment, such as a TV or stereo system. At the same time stream 501 is being processed to produce output stream 530, data stream processor 502 stores in memory 504 the information from input stream 503, as illustrated by output stream 540.

Like data stream processor 402, data stream processor 502 is configured so as to identify the beginning and ending of the audio/visual works that make up input stream 503. In this way, data stream processor 502 is able to determine the beginning and/or ending of the songs stored in memory 504.

Similarly, like system 400, system 500 enables the consumer to purchase the current song being processed by data stream processor 502 or an un-purchased song stored in persistent storage device 506. As described above, to purchase a song, the consumer sends a "buy" signal to processing unit

508 through user interface 512. Upon receiving the buy signal, processing unit 508 performs the same processes as that described above with respect to processing unit 408 receiving the buy signal.

Also, like system 400, system 500 can be programmed to store onto persistent storage device 506 all of the works (or only those works that meet a predetermined criteria) that are in output stream 504, regardless of whether the consumer has sent a buy signal to system 500. Preferably, in this embodiment, the works are copy and/or use protected before being stored onto persistent storage device 506 and the consumer must receive authorization from a trusted source (e.g., obtain a decryption key from the trusted source) in order to gain access to the works.

Although the data stream processor 402/502 is shown being separate from processing unit 408/508, it is contemplated that they need not be separate units and that a powerful enough microprocessor could function as both.

While various embodiments/variations of the present invention have been described above, it should be understood that they have been presented by way of example only, and not limitation. Thus, the breadth and scope of the present invention should not be limited by any of the above-described exemplary embodiments.

What is claimed is:

1. A method for enabling a user to obtain a copy of a broadcast audio/video work, comprising the steps of:
   receiving two audio/video streams substantially simultaneously: (1) a first audio/video stream and (2) a second audio/video stream, wherein said first audio/video stream comprises the audio/video work formatted according to a first encoding scheme and said second audio/video stream comprises the audio/video work formatted according to a second encoding scheme, wherein said first encoding scheme is different from said second encoding scheme;
   determining whether the audio/video work matches a profile associated with the user;
   in response to determining that the received audio/video work matches the profile, storing the received audio/video work in a storage device local to the user regardless of whether at the time the audio/video work was received the user indicated a desire to have the audio/video work stored in said storage device and adding to a list of unpurchased works stored in the storage device an identifier identifying the work;
   receiving an indication from the user that indicates that the user desires to view the list of unpurchased audio/video works stored in the storage device;
   displaying the list in response to the user indicating said desire to view the list;
   receiving an indication from the user that indicates that the user desires to obtain a copy of or use the audio/video work; and
   processing the audio/video work stored in said storage device in response to the user indicating said desire to obtain the audio/video work.

2. The method of claim 1, wherein said step of processing the audio/video work comprises processing the audio/video work so that at least some of a copy and/or use protection is removed.

3. The method of claim 1, further comprising: after receiving the broadcast data stream, copy and/or use protecting the received audio/video work.

4. The method of claim 3, wherein said step of copy and/or use protecting the received audio/video work occurs after the step of storing the audio/video work in the storage device.

5. The method of claim 1, further comprising playing the audio/video work as it is being received.

6. The method of claim 5, further comprising copy and/or use protecting the received audio/video work, wherein said step of copy and/or use protecting the received audio/video work occurs after the step of playing the audio/video work.

7. The method of claim 1, further comprising the step of compressing the audio/video prior to storing it in said storage device.

8. The method of claim 1, wherein said storage device is a persistent storage device.

9. The method of claim 8, wherein said step of processing the audio/video work comprises the step of determining that the user is authorized to obtain a copy of the audio/video work.

10. The method of claim 9, wherein said step of processing the audio/video work further comprises the step of disabling at least some of a copy and/or use protection if the user is determined to be authorized to obtain a copy of the audio/video work.

11. The method of claim 1, wherein said step of processing the audio/video work further comprises the step of creating a compressed version of an audio portion of said audio/video work stored in the storage device using an audio compression scheme.

12. The method of claim 11, wherein said audio compression scheme is one of the Windows Media, MP3, or Real Audio compression scheme.

13. A system for enabling a consumer to obtain an audio/video work, comprising:
   a stream processor configured to receive from a remote system two audio/video streams substantially simultaneously: (1) a first audio/video stream and (2) a second audio/video stream, wherein said first audio/video stream comprises the audio/video work formatted according to a first encoding scheme and said second audio/video stream comprises the audio/video work formatted according to a second encoding scheme, wherein said first encoding scheme is different from said second encoding scheme;
   a data store operable to store the audio/video work formatted according to said second encoding scheme; and
   a user interface for enabling the consumer to indicate that the consumer desires to obtain a copy of the audio/video work.

14. The system of claim 13, wherein said stream processor comprises a first tuner for receiving said first audio/video stream and a second tuner for receiving said second audio/video stream.

15. The system of claim 13, wherein said stream processor comprises one tuner for receiving both of said first and said second audio/video streams.

16. The system of claim 13, further comprising a processing unit that communicates with an authorization system for determining whether the consumer is authorized to obtain a copy of the audio/video work, wherein said processing unit communicates with said authorization system in response to the consumer indicating that the consumer desires to obtain a copy of the audio/video work.

17. The system of claim 16, wherein said processing unit processes the audio/video work stored in said storage means in response to receiving from said authorization system an indication that the consumer is authorized to obtain the audio/video work.

18. The system of claim 17, wherein said processing unit stores onto a persistent storage device a copy of the audio/ video work stored in said storage means in response to receiving from said authorization system said indication.

19. The system of claim 18, wherein said storage means is a volatile storage device.

20. The system of claim 19, wherein said volatile storage device comprises random access memory.

21. The system of claim 13, further comprising a processing unit that processes the audio/video work stored in said storage means in response to the consumer indicating that the consumer desires to obtain a copy of the audio/video work.

22. The system of claim 21, wherein said processing unit stores onto a persistent storage device a copy and/or use protected copy of the audio/video work stored in said storage means in response to the consumer indicating that the consumer desires to obtain a copy of the audio/video work.

23. The system of claim 13, wherein the audio/video work stored in said storage means is copy and/or use protected.

24. The system of claim 23, wherein said storage means is a persistent storage device.

25. The system of claim 24, wherein said persistent storage device is a hard disk.

26. A method for enabling a consumer to obtain an audio/video work, comprising:
receiving a first audio/video stream and a second audio/video stream substantially simultaneously, wherein said first audio/video stream comprises the audio/video work formatted according to a first encoding scheme and said second audio/video stream comprises the audio/video work formatted according to a second encoding scheme, wherein said first encoding scheme is different from said second encoding scheme;
storing the audio/video work formatted according to said second encoding scheme in a storage device; and
enabling the consumer to indicate that the consumer desires to obtain a copy of the audio/video work.

27. The method of claim 26, wherein said first audio/video stream is received by a first tuner and said second audio/video stream is received by a second tuner.

28. The method of claim 26, wherein a single tuner receives both of said first audio/video stream and said second audio/video stream.

29. The method of claim 26, further comprising the step of determining whether the consumer is authorized to obtain a copy of the audio/video work in response to the consumer indicating that the consumer desires to obtain a copy of tile audio/video work.

30. The method of claim 29, further comprising the step of processing the audio/video work stored in said storage device in response a determination that the consumer is authorized to obtain the audio/video work.

31. The method of claim 30, wherein said step of processing the audio/video work stored in said storage device comprises the step of storing onto a persistent storage device a copy of the audio/video work stored in said storage device.

32. The method of claim 31, wherein said storage device is a volatile storage device.

33. The method of claim 32, wherein said volatile storage device comprises random access memory.

34. The method of claim 26, further comprising means the step of processing the audio/video work stored in said storage device in response to the consumer indicating that the consumer desires to obtain a copy of the audio/video work.

35. The method of claim 34, wherein said step of processing the audio/video work stored in said storage device comprises the step of storing onto a persistent storage device a copy and/or use protected copy of the audio/video work stored in said storage device.

36. The method of claim 26, further comprising the step of copy and/or use protecting the audio/video work prior to storing it in said storage device.

37. The method of claim 36, wherein said storage device is a persistent storage device.

38. The method of claim 37, wherein said persistent storage device is a hard disk.

* * * * *